United States Patent [19]

Iwaki

[11] Patent Number: 5,130,817
[45] Date of Patent: Jul. 14, 1992

[54] ELECTRONIC APPARATUS

[75] Inventor: Junichi Iwaki, Nara, Japan

[73] Assignee: Sharp Kabushiki Kaisha, Osaka, Japan

[21] Appl. No.: 496,255

[22] Filed: Mar. 20, 1990

[30] Foreign Application Priority Data

Mar. 30, 1989 [JP] Japan .................................. 1-80566

[51] Int. Cl.⁵ .............................................. H04N 1/00
[52] U.S. Cl. ................................... 358/400; 258/468; 379/100
[58] Field of Search ............... 358/400, 401, 476, 468; 379/100

[56] References Cited

U.S. PATENT DOCUMENTS 4,831,457 5/1989 Watanabe et al. .................. 358/476

FOREIGN PATENT DOCUMENTS 56-119359 9/1981 Japan .
56-152458 11/1991 Japan .

Primary Examiner—Edward L. Coles, Sr.
Attorney, Agent, or Firm—Nixon & Vanderhye

[57] ABSTRACT

An electronic apparatus includes an input key board adjustable by 90° with respect to the direction of operation so that the electronic apparatus can be installed at any limited site.

8 Claims, 9 Drawing Sheets

ELECTRONIC APPARATUS

BACKGROUND OF THE INVENTION

1. Field of the Invention

The present invention relates to an electronic apparatus such as a facsimile apparatus or a copying machine, and more particularly to an electronic apparatus having an operation board whose position is adjustable with respect to the location of the electronic apparatus.

2. Description of the Prior Art

In order to explain the background of the present invention, reference will be made to FIG. 11, which is a plan view showing a typical example of a known facsimile apparatus, generally designated by the reference numeral 1. The facsimile apparatus 1 includes an original tray 2, a guide member 3 for guiding a read-through original, and a key board 5 having a handling set 4.

Since the key board 5 is located at a fixed position on the facsimile apparatus 1 with respect to the direction of an original is fed through the apparatus, hereinafter this direction being referred to as "the direction of operation", the location of the apparatus is fixed with respect to the key board 5. If office space is too limited, it will be difficult to find a site for installing this type of facsimile apparatus. Even if the apparatus is installed in a limited place, the operator will suffer from the handling difficulty.

SUMMARY OF THE INVENTION

The electronic apparatus of the present invention, which overcomes the above-discussed and numerous other disadvantages and deficiencies of the prior art, comprises: a main body; an operating means mounted on the main body for inputting various instructions to the electronic apparatus; and means for connecting the operating means to the main body, the means comprising an adjusting means for shifting the operating means by 90° with respect to the direction of operation.

In a preferred embodiment, the adjusting means comprises a cylindrical member secured to the operating means, and a bracket member secured to the main body, wherein the cylindrical member is loosely fitted in the bracket member so that the operating means rests on the bracket member in a rotative manner.

Thus, the invention described herein makes possible the objective of installing the electronic apparatus any place irrespective of a limited site in the office space, without taking the position of the key board into consideration.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
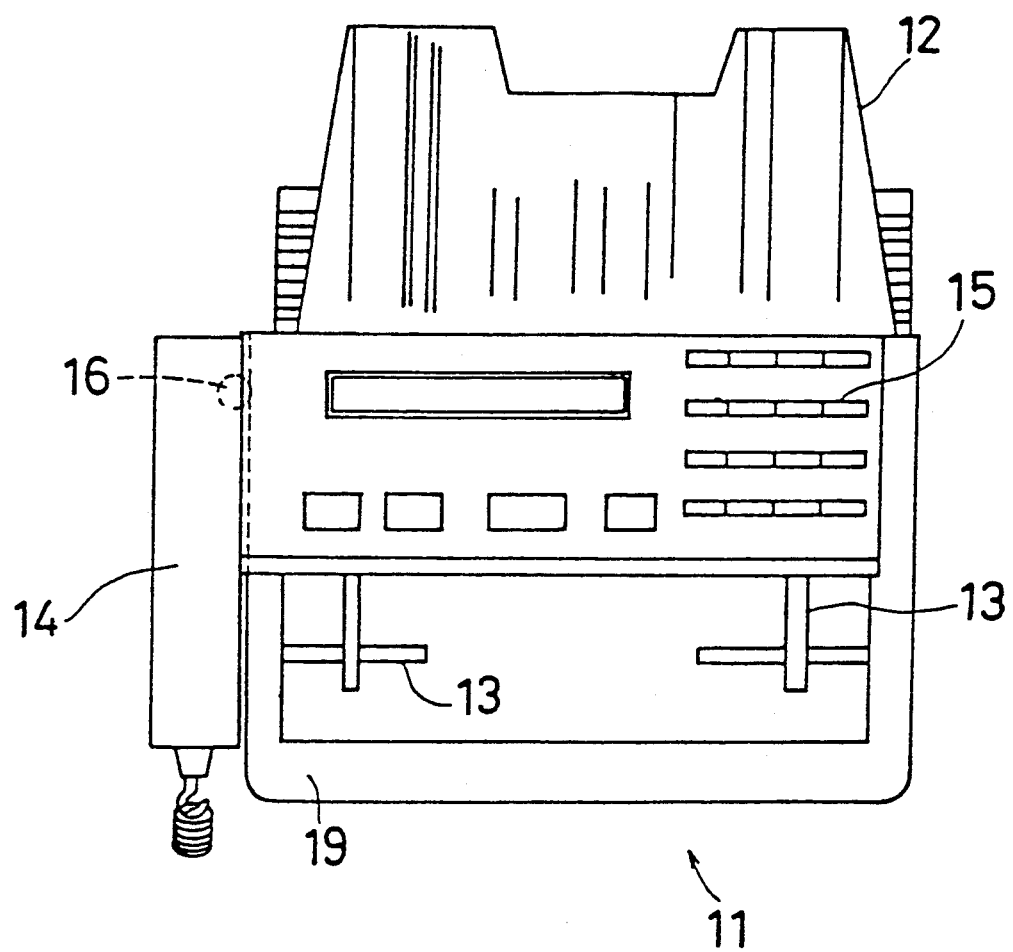
FIG. 1 is a plan view of a facsimile apparatus according to the present invention.
Figure 2:
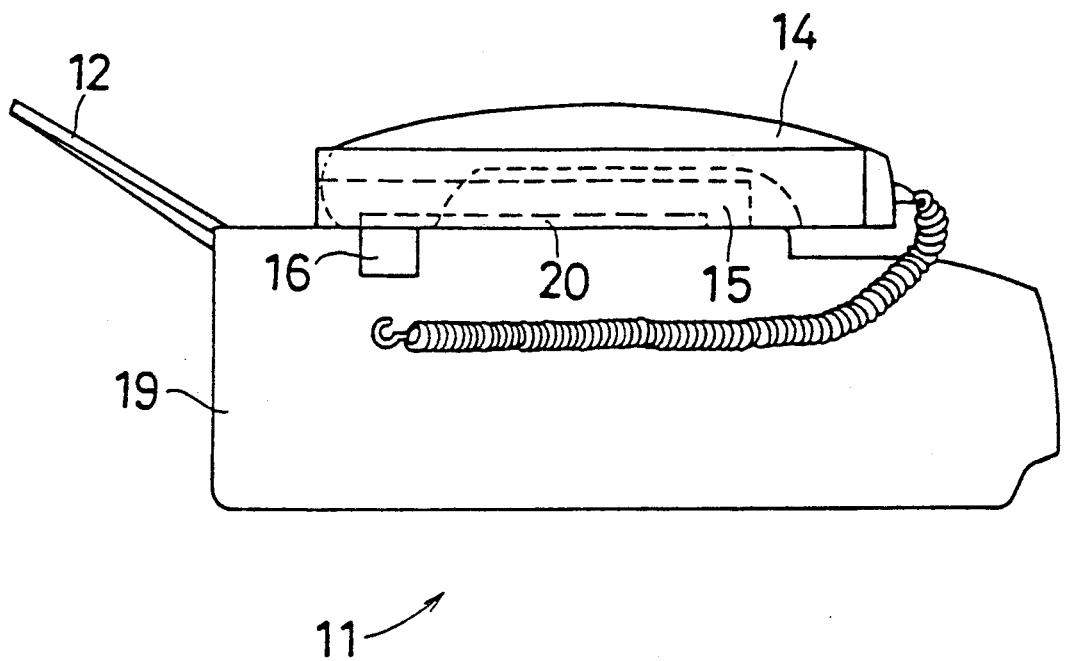
FIG. 2 is a left-side view showing the facsimile apparatus of FIG. 1.
Figure 3:
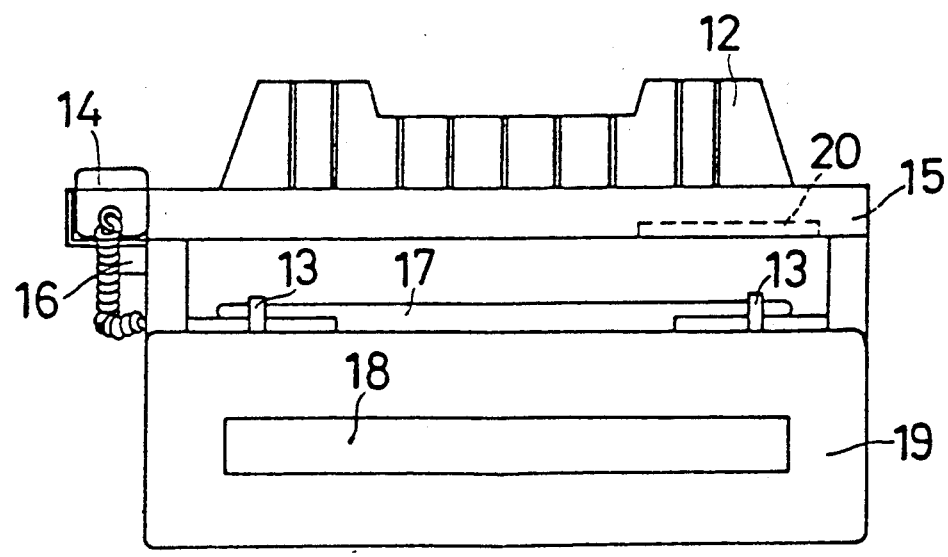
FIG. 3 is a front view showing the facsimile apparatus of FIG. 1.

As shown in FIG. 1 a facsimile apparatus 11 is provided with an original tray 12, a guide member 13 for guiding a read-through original, and an input key board 15 including a handling set 14. A cylindrical coupling 16, which connects the main body 19 of the facsimile apparatus 11 and the handling set 14, can revolve about its own axis. In accordance with the revolving of the cylindrical coupling 16 the input key board 15 rotates and changes its position with respect to the direction of operation. The reference numeral 20 denotes a foldable rib (FIG. 8) hinged to the bottom surface of the input key board 15. The main body 19 has an original discharge outlet 17 and an outlet through which a recording material such as paper is discharged (FIG. 3).

Figure 4:
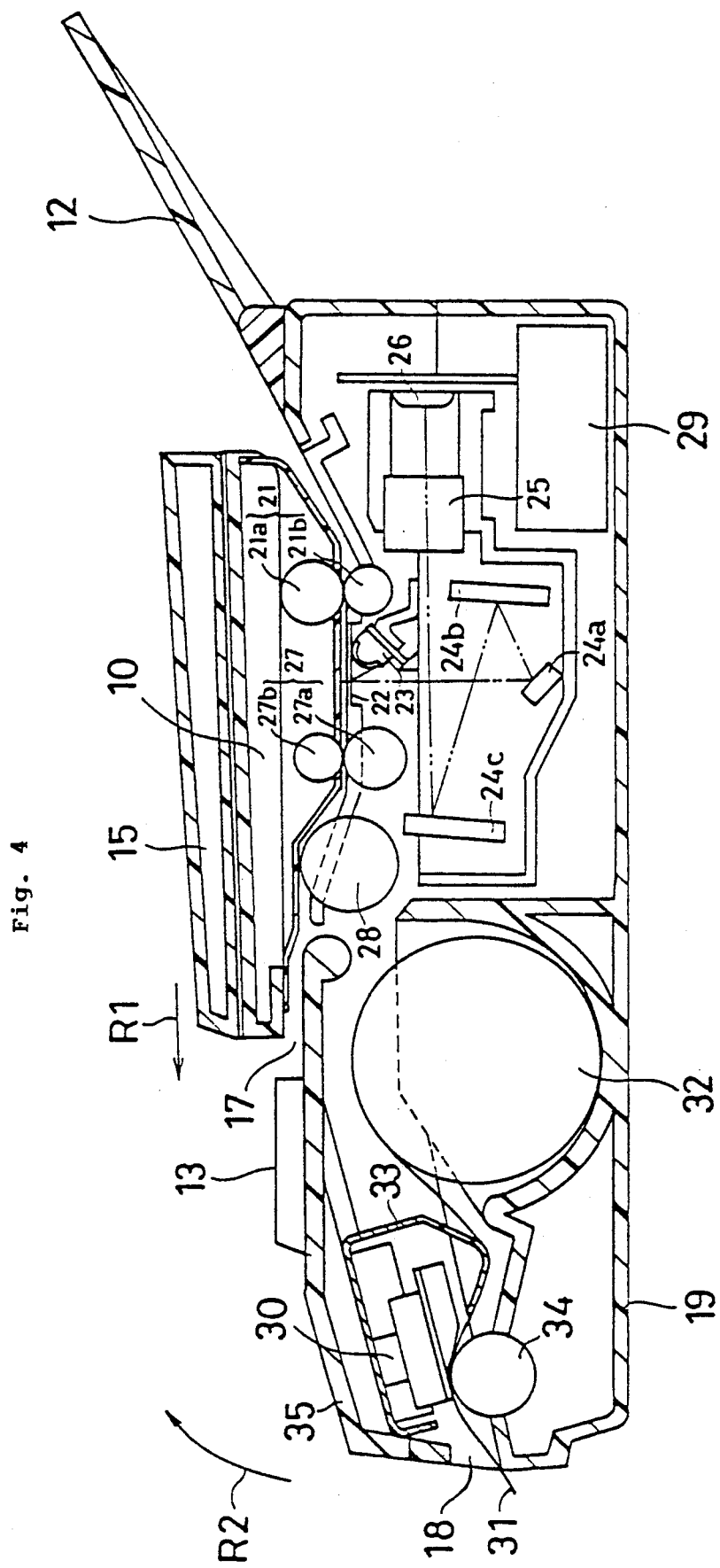
FIG. 4 is a sectional view showing the structure of the facsimile apparatus of FIG. 1.

Referring to FIG. 4 an original is placed on the original tray 12 and is fed to a reading station by first feed rollers 21, which comprises a driving roller 21a and a driven roller 21b. A glass panel 22 is disposed at the reading station and the surface of the original is exposed to light from a light source 23 through the glass panel 22. The original reflects the light and the reflecting light reflects on mirrors 24a, 24b and 24c. In this way the original is read by a read-out device through a lens 25 by a charge-couple device (CCD) or the like. The picture data from a read-out device 26 is modulated by a signal processing device 29, and transmitted through a telephone line. The read-through original is fed in the direction of arrow R1 by second feed rollers 27, which comprise a driving roller 27a and a driven roller 27b, and a carrier 28. In this way the original is fed out through the outlet 17. The first and second feed rollers 21 and 27 are housed in a housing 10, and the input key board 15 is disposed on the housing 10.

To function as a receiver, the main body 19 accommodates a roll 32 of a recording material 31 such as paper which is subjected to thermal treatment by a recording means 30 such as a thermal head. The recording material 31 from the roll 32 is introduced through the guide member 33 between the recording means 30 and a roller 34 so that the received picture data is recorded on the recording material 31. The recording means 30 is integral with a cover 35. By opening the cover 35 in the direction of arrow R2, the inside is accessible to an operator to treat a jam or replace an empty paper roll 32 with a full one. When the cover 35 is closed, the recording means 30 is pressed through the recording material 31 against the roller 34. In this state the rotation of the roller 34 permits the recording material 31 to discharge through the outlet 18.

Figure 5:
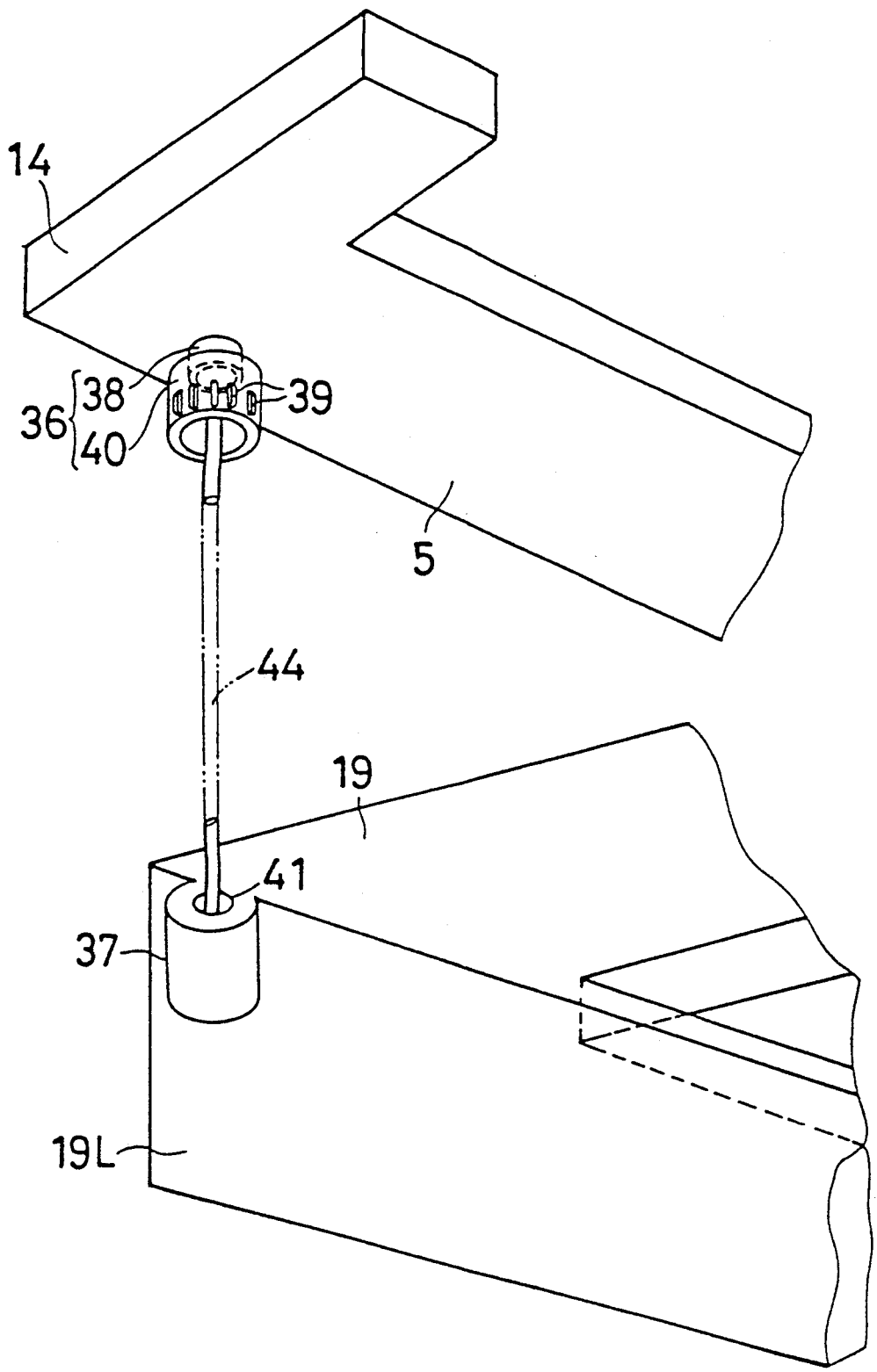
FIG. 5 is an exploded perspective view of the facsimile apparatus of FIG. 1.
Figure 6:
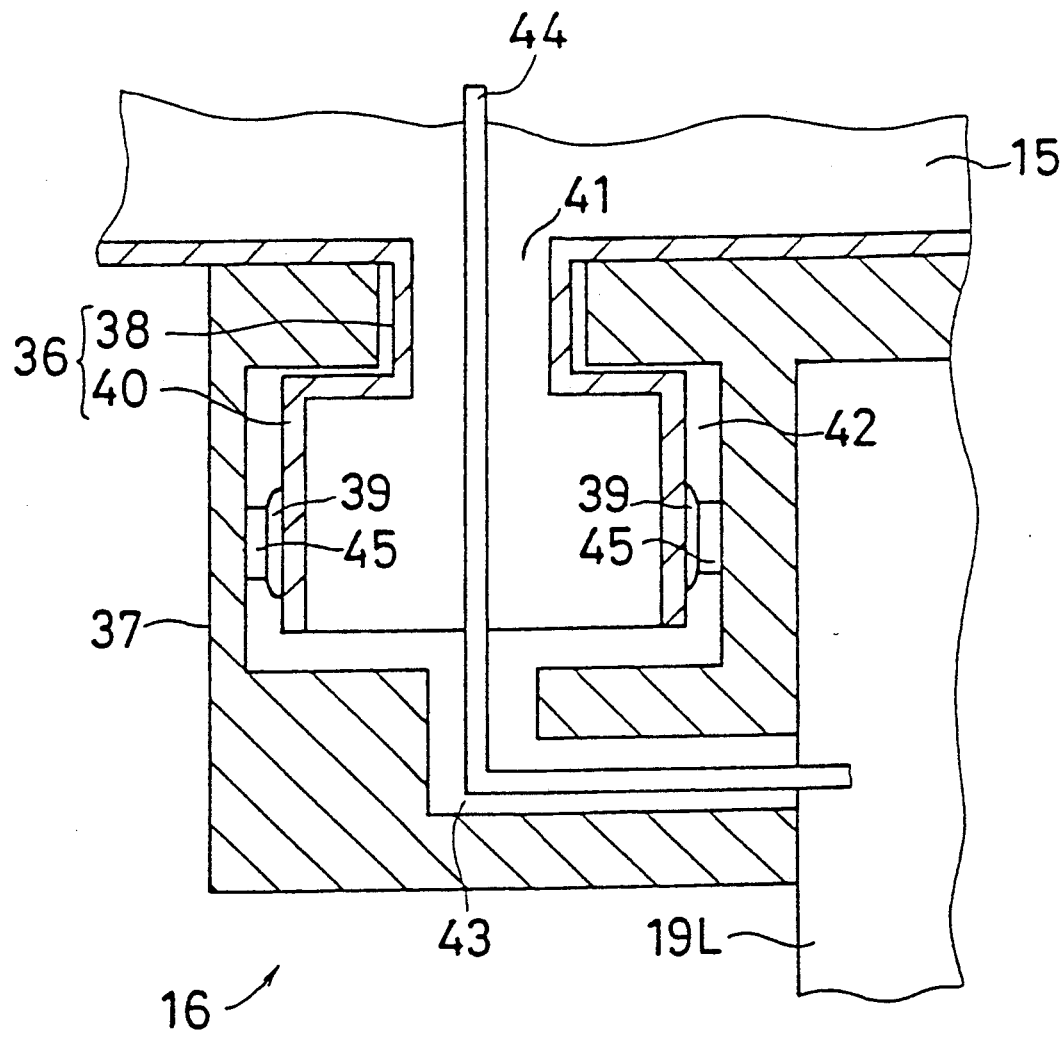
FIG. 6 is a sectional view showing a peripheral portion of a connecting part between the facsimile apparatus and an input key board.

Referring to FIGS. 5 and 6 the input key board 15 is provided with a short cylinder 36 on its bottom, which comprises a throat portion 38, a plurality of projections 39 for constituting a click mechanism and a body portion 40, preferably the throat portion 38 being shorter than the body portion 40. The main body 19 of the facsimile apparatus 11 includes a side wall 19L (at the left-hand in FIG. 1) to which a bracket 37 is fixed so as to receive the body portion 40 of the short cylinder 36 in a space 42 thereof. In this way the input key board 15 rests on the bracket 37 in a rotative manner around the short cylinder 36.

Figure 7:
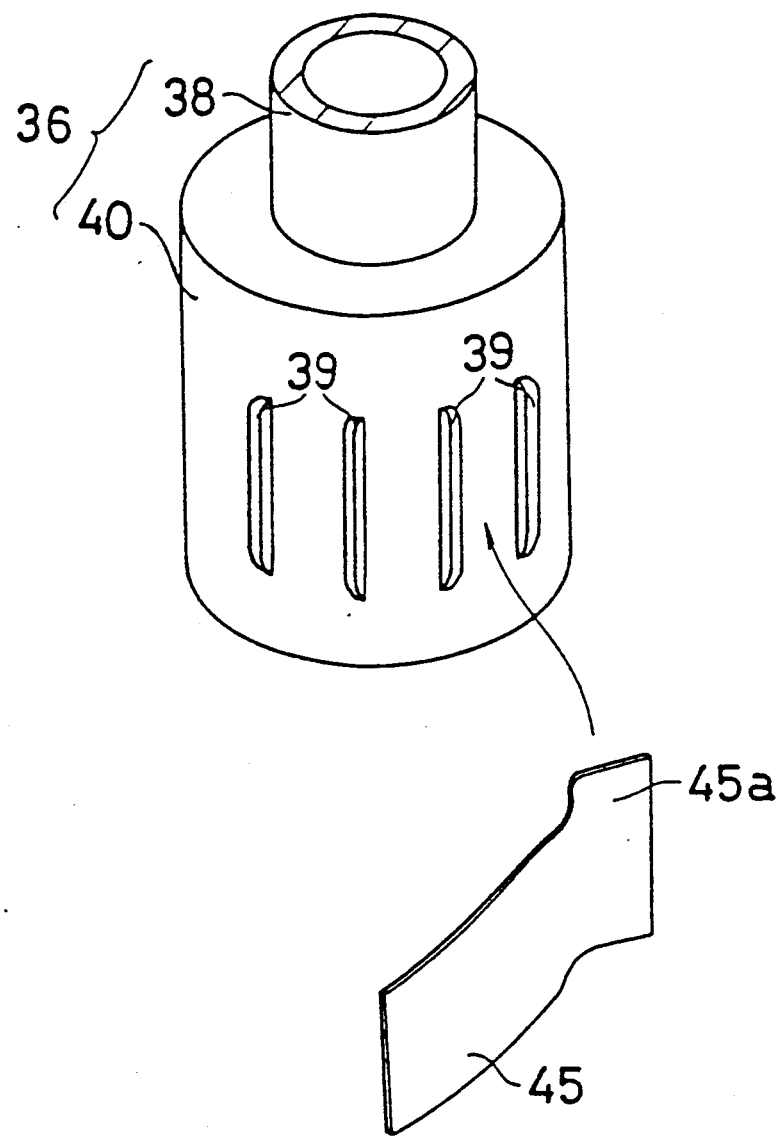
FIG. 7 is a perspective view showing a cylinder.

The reference numeral 41 denotes a restricted opening of the bracket 37 in which the throat portion 38 of the short cylinder 36 is loosely fitted, and a cable 44 leading from the input key board 15 is passed through the short cylinder 36 and is led to the main body 19 through a bore 43 produced in the bottom portion of the bracket 37. The body portion 40 of the short cylinder 36 is provided with the projections 39 on its outside wall as best shown in FIG. 7. The restricted opening 41 has a smaller diameter than the body portion 40 of the short cylinder 36, thereby preventing the short cylinder 36 from being demounted therefrom.

Referring to FIG. 7, the bracket 37 is provided with a plurality of leaf springs 45 on its inside wall. Each leaf spring 45 has an ear portion 45a forcibly inserted between the adjacent projections 39 so as to constitute a click joint between the short cylinder 36 and the bracket 37.

Figure 8:
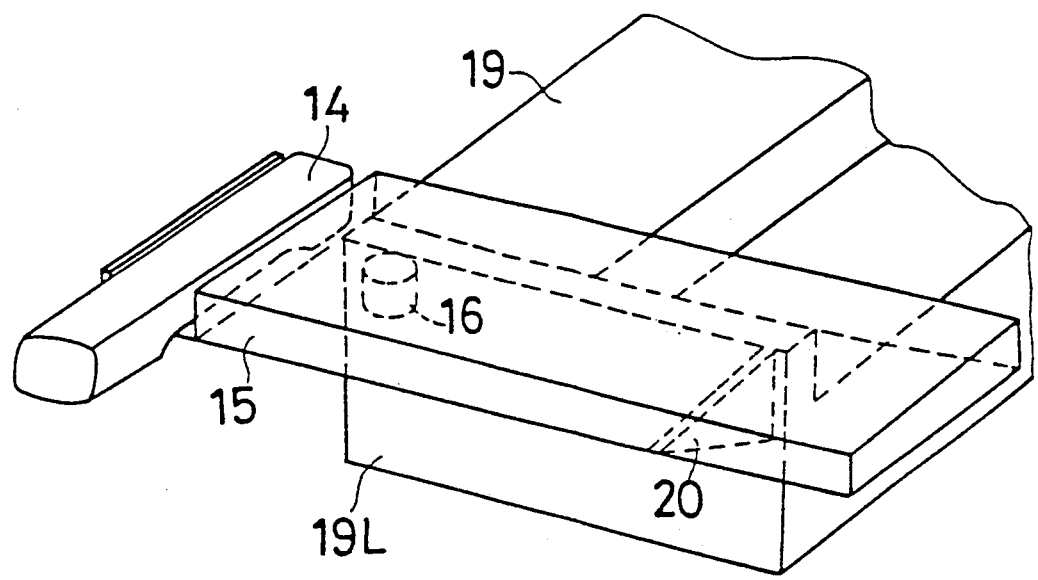
FIG. 8 is a perspective view showing the input key board.
Figure 9:
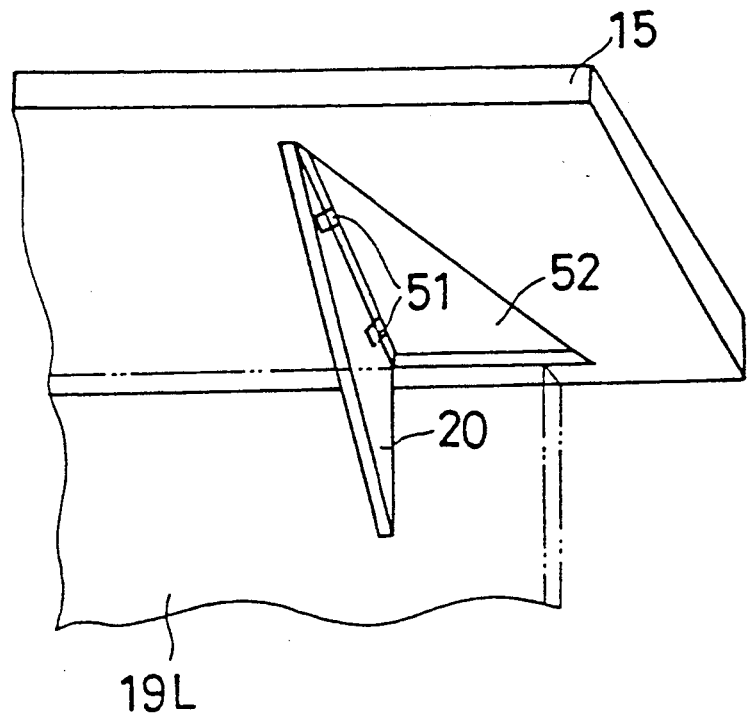
FIG. 9 is a perspective view showing the bottom of the input key board.

As shown in FIG. 8 the input key board 15 can be rotated by 90° from the state shown in FIG. 1. After the input key board 15 is rotated at 90°, it is supported by the left side wall 19L of the main body 19 by means of the foldable rib 20, which is hinged to the bottom surface of the input key board 15, and is normally housed in a recess 52 produced on the same bottom surface. FIG. 9 shows the rib 20 in an unfolded state.

Figure 10:
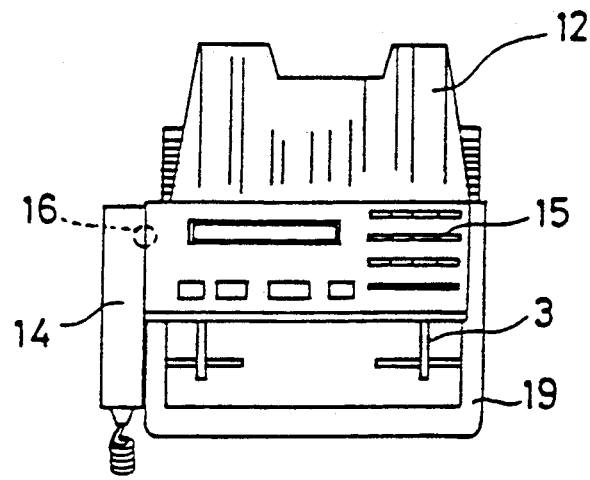
FIGS. 10(1) to (3) inclusive are plan views showing the steps of shifting the position of the input key board.
Figure 10:
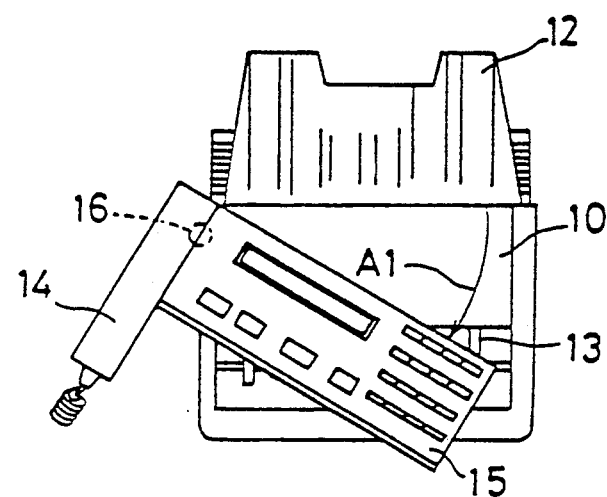
Figure 10:
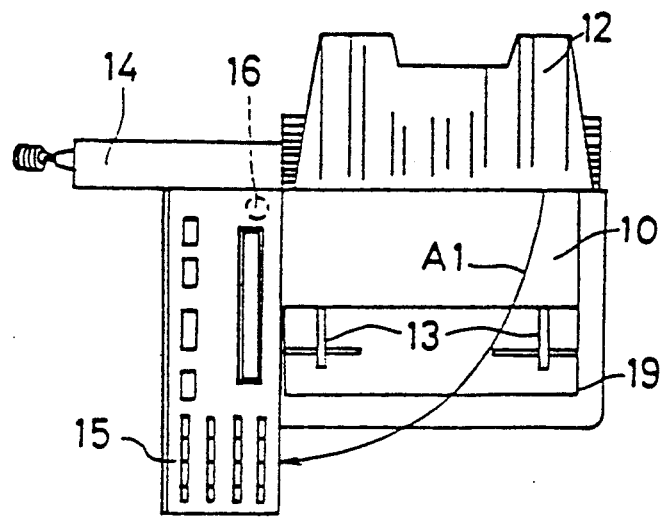
Figure 11:
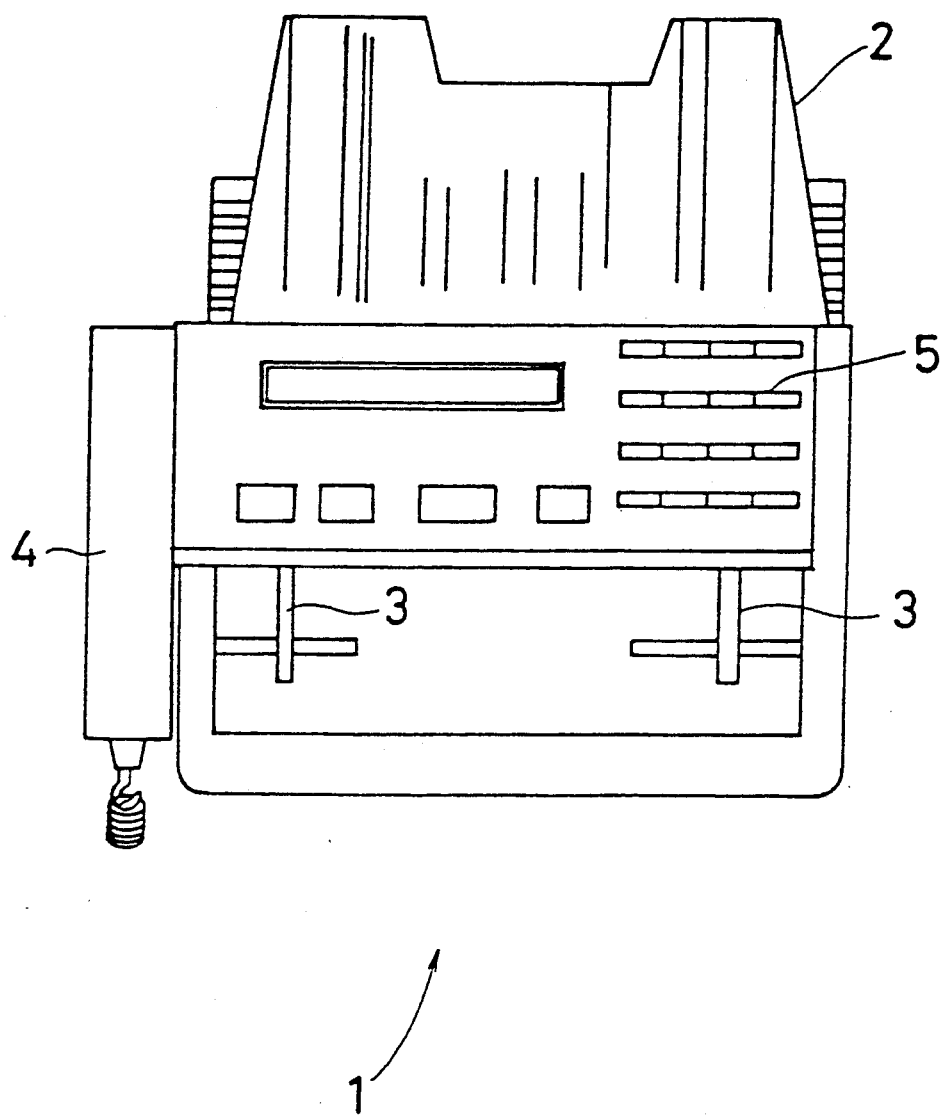
FIG. 11 is a plan view showing a conventional facsimile apparatus.

FIGS. 10(1) to (3) show a process by which the input key board 15 is rotated by 90° from its regular position as shown in FIG. 10(l). Normally the input key board 15 is perpendicular to the direction of operation (FIG. 10(1)). If office space does not permit the facsimile apparatus to be installed in this normal posture, the input key board 15 is rotated by 90° as shown in FIG. 10(3). FIG. 10(2) shows the input key board in mid shift. After the 90° angular displacement of the input key board 15 is finished, the top surface of the housing 10 is exposed as shown in FIG. 10(3), but this does not spoil the appearance of the facsimile apparatus.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An electronic apparatus comprising:
   a main body;
   an operating means mounted on the main body for inputting various instructions to the electronic apparatus; and
   wherein the operating means comprises a cylindrical member on the back thereof, and the main body comprises a receiving member for enabling the cylindrical member to be rotatably held therein, the cylindrical member and the receiving member allowing a cable to pass through so as to effect electrical communication therebetween, thereby ensuring that the operating means is shifted by 90° horizontally with respect to the direction of operation.

2. An electronic apparatus according to claim 1, wherein the cylindrical member is loosely fitted in the receiving member.

3. An electronic apparatus according to claim 1, wherein the cylindrical member comprises a click mechanism.

4. An electronic apparatus comprising:
   a main body having a document scanner;
   a user input device rotatably mounted on the main body for receiving instructions, said input device having first and second operating positions from which the user can input instructions to the electronic apparatus, said input device being rotated in a substantially horizontal plane between said first and second operating positions.

5. An electronic apparatus as in claim 4 wherein said apparatus is a facsimile machine.

6. An electronic apparatus as in claim 4 wherein said main body further comprises a linear document passage for receiving documents to be scanned and wherein said first operating position of said user input device is substantially parallel to said document passage and said second operating position is substantially perpendicular to said document passage.

7. An electronic apparatus as in claim 4 wherein said input device further comprises a cylindrical member coupled to said main body, a receiving member affixed to said cylindrical member rotatable about a vertical axis of said receiving member, the cylindrical member and the receiving member allowing the passage of electrical communications between the input device and main body.

8. An electronic apparatus according to claim 7, wherein said clyindrical member further comprises a click mechanism engaging said receiving member.

* * * * *